US007224810B2

(12) United States Patent
Brown

(10) Patent No.: US 7,224,810 B2
(45) Date of Patent: May 29, 2007

(54) NOISE REDUCTION SYSTEM

(75) Inventor: C. Phillip Brown, Castro Valley, CA (US)

(73) Assignee: Spatializer Audio Laboratories, Inc., Santa Clara, CA (US)

( * ) Notice: Subject to any disclaimer, the term of this patent is extended or adjusted under 35 U.S.C. 154(b) by 817 days.

(21) Appl. No.: 10/661,453

(22) Filed: Sep. 12, 2003

(65) Prior Publication Data

US 2005/0058301 A1 Mar. 17, 2005

(51) Int. Cl.
*H04B 15/00* (2006.01)

(52) U.S. Cl. ...................... 381/94.3; 704/226; 704/233

(58) Field of Classification Search ............... 381/94.1, 381/94.2, 94.3; 704/226, 233
See application file for complete search history.

(56) References Cited

U.S. PATENT DOCUMENTS

| | | | | |
|---|---|---|---|---|
| 5,027,410 | A | 6/1991 | Williamson et al. | |
| 5,388,182 | A | 2/1995 | Benedetto et al. | |
| 5,550,924 | A * | 8/1996 | Helf et al. | 381/94.3 |
| 6,122,384 | A * | 9/2000 | Mauro | 381/94.3 |
| 6,122,610 | A | 9/2000 | Isabelle | |
| 6,363,345 | B1 * | 3/2002 | Marash et al. | 704/226 |
| 6,453,289 | B1 | 9/2002 | Ertem et al. | |
| 2002/0177995 | A1 | 11/2002 | Walker | |

OTHER PUBLICATIONS

Thiemann, Joachim, "Acoustic Noise Suppression for Speech Signals using Auditory Masking Effects", Thesis submitted to Department of Electrical & Computer Engineering, McGill University, Montreal, Canada, Jul. 2001, 74 pages.

(Continued)

*Primary Examiner*—Brian Pendleton
(74) *Attorney, Agent, or Firm*—Wilson Sonsini Goodrich & Rosati

(57) ABSTRACT

The disclosure includes description of a method of noise reduction according to one possible implementation. An audio signal is sampled at a sample rate f. The audio signal is converted to a digital signal in the time domain. For each of a series of frames of time, the digital signal in the time domain is converted to a digital signal in frequency domain for the frame of time. The converting includes determining a set of frequency domain values. The frequency domain values in the set are created by a set of digital filters, and the digital filters are related to each other by a constant ratio of filter bandwidth to center frequency, related to a perceptual scale for audio processing. A set of minimum magnitude frequency domain values is obtained. These values include, at each frequency represented by the frequency domain values, a frequency domain value having a minimum magnitude from among frequency domain values for such frequency over a time interval spanning multiple frames of time. The set of minimum magnitude frequency domain values are subtracted from the audio signal and the frequency domain, for a particular frame of time. The subtracted audio signal is converted to the time domain, and the converted audio signal is output. The disclosure also includes description of a communication device, a playback device, a multimedia recording device, a recording device, and other devices and processes.

28 Claims, 16 Drawing Sheets

OTHER PUBLICATIONS

Parikh, Gaurang K., "The Effect of Noise on the Spectrum of Speech", Masters Degree Thesis submitted to The University of Texas at Dallas, Aug. 2002, 79 pages.

Martin, Rainer, "Spectral Subtraction Based on Minimum Statistics", *Signal Processing VII: Theories and Applications*, M. Halt et al. (Eds), European Assoc. for Signal Processing, (1994), pp. 1182-1185.

Cohen, I. et al., "Noise Estimation by Minima Controlled Recursive Averaging for Robust Speech Enhancement", *IEEE Signal Processing Letters*, vol. 9, No. 1, Jan. 2002, pp. 12-15.

Kamath, Sunil D. et al., "A Multi-Band Spectral Subtraction Method for Enhancing Speech Corrupted by Colored Noise", Department of Electrical Engineering, University of Texas at Dallas, 4 pages.

* cited by examiner

NOISE REDUCTION SYSTEM

BACKGROUND

1. Field of the Invention

This invention relates to the field of signal processing and audio systems.

2. Background

Technology for reducing noise in audio systems has seen improvement in recent years. For example, many different techniques are used to remove hiss from analog tape. Some techniques involve using multiple microphones to help analyze the noise before removal. Materials may be added to dampen surrounding and improve noise levels. Consumers still desire better noise reduction. Further, with the proliferation of electronic devices like cellular telephones, consumers continue to use items with lower quality while not benefiting from some of the known technology for optimal sound.

Numerous filtering techniques have been proposed to correct for magnitude response of audio systems, in particular in order to correct for speech corrupted by additive noise. Despite the advances in such technologies, there remains a need for improved audio circuits and systems to help produce improved sound quality in various environments.

DETAILED DESCRIPTION

An embodiment of the invention is directed to a noise reduction system for voice and music. An extended form of spectral subtraction is used. Spectral subtraction is a process whereby noise in the input signal is estimated and then "subtracted" out from the input signal. The method is used in the frequency domain. Prior to processing in the frequency domain, the signal is converted to the frequency domain from the time domain unless the signal is already in the frequency domain.

The magnitude and phase components of the input signal are separated. Then the system may work strictly with the magnitude, rather than power. At the end of the processing, the phase is combined back into the subtracted signal. A set of minimum magnitude frequency domain values is obtained. The set includes, at each frequency represented by the frequency domain values, a frequency domain value having a minimum magnitude from among frequency domain values for such frequency over a time interval spanning multiple frames of time.

Figure 1:
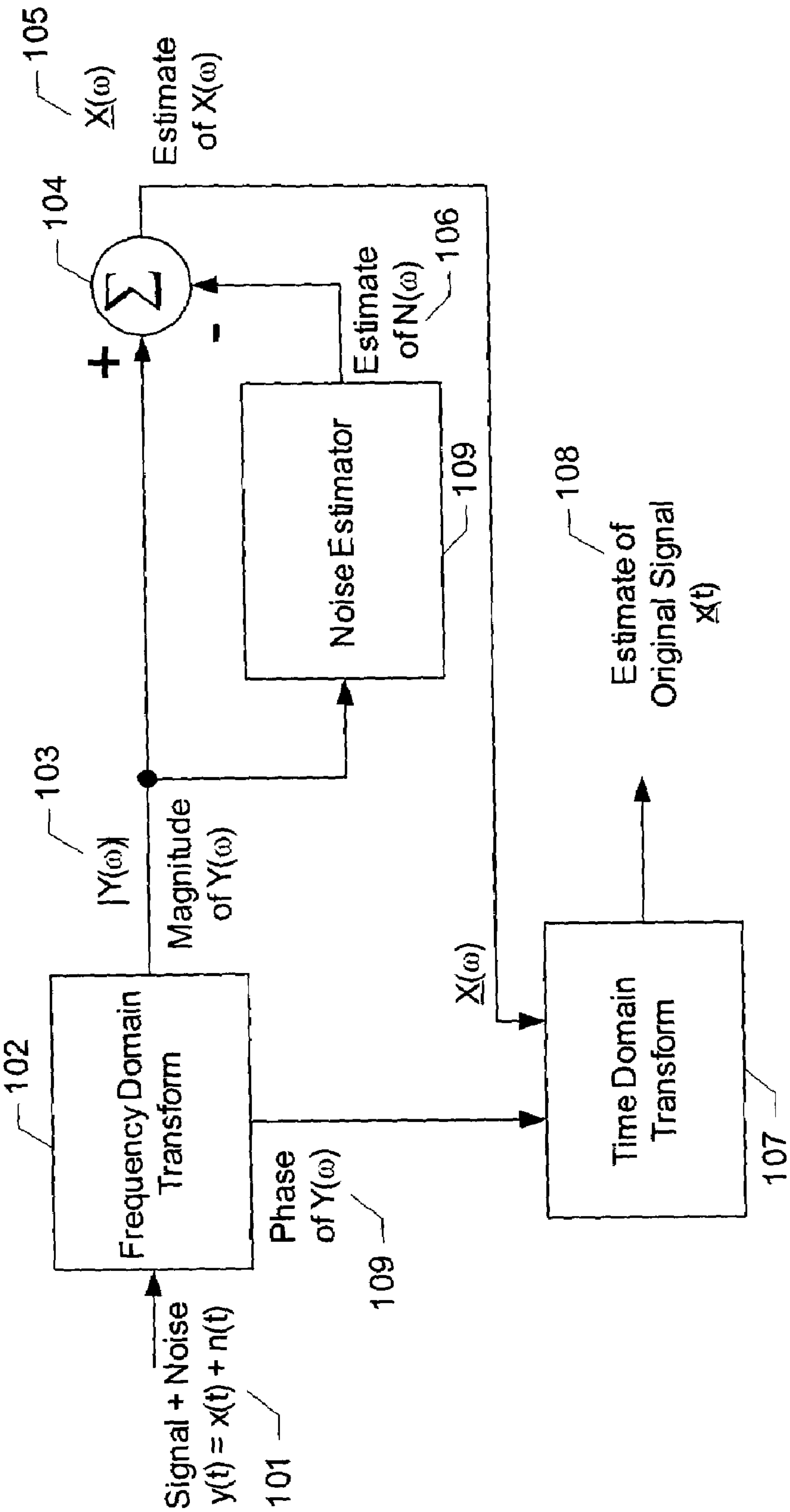
FIG. 1 shows a noise reduction system according to an embodiment of the invention.

FIG. 1 shows a noise reduction system according to an embodiment of the invention. The system includes frequency domain transform block 102, noise estimator block 109, summation block 104 and time domain transform block 107. Also shown are signal plus noise 101, magnitude 103, frequency domain estimate of signal $\underline{X}(\omega)$ 105 and time domain estimate of original signal x(t) 108. The output of frequency domain transform block 102 is coupled to the positive input of summation block 104 and the input of noise estimator block 109. The output of noise estimator 109 is coupled to the negative input of summation block 104. The output of summation block 104 is coupled to the input of time domain transform block 107.

A signal is processed in the system in FIG. 1 as follows. An input which includes signal and noise, y(t)=x(t)+n(t) 101 is transformed into the frequency domain in frequency domain transform block 102. The output of frequency domain transform block 102 is a magnitude vector 103 in the frequency domain, as represented by $|Y(\omega)|$. Noise estimator block 109 uses the magnitude of the input signal in the frequency domain, $|Y(\omega)|$ 103, to provide an estimate in the frequency domain N(ω) 106 of the noise. This estimate of noise is subtracted from magnitude of the signal, in the frequency domain $|Y(\omega)|$ 103 in summation block 104. The result of the combination of $|Y(\omega)|$ 103 with estimate of noise N(ω) 106 is an estimate of the signal in the frequency domain, $\underline{X}(\omega)$ 105. The estimate $\underline{X}(\omega)$ 105 of the magnitude of the signal is combined with phase 110 of Y(ω) in time domain transform block 107. The output of time domain transform block 107 is an estimate, $\underline{x}(t)$ 108, of the original signal.

In an exemplary embodiment of the invention, an audio signal is sampled at a sample rate f. The audio signal is converted to a digital signal in time domain. For each of a series of frames of time, the digital signal in the time domain is converted to a digital signal in frequency domain for the frame of time. The converting includes determining a set of frequency domain values, the frequency domain values in the set created by a set of digital filters, the digital filters related to each other by a constant ratio of filter bandwidth to center frequency, related to a perceptual scale for auditory processing.

To convert to the frequency domain, the time domain samples can be split into frames (typically a power of two in length, such as $2^{10}=1024$) and then converted to the frequency domain by a transform such as the short-time Fourier transform (STFT). The STFT is typically used for signal processing where audio fidelity is critical. The input samples can be windowed prior to the STFT by a Hann window. The input samples have some overlap between successive frames (25% to 50% overlap in one embodiment). This procedure is called "overlap-and-add."

The human auditory system works along what is called a "perceptual scale." This is related to a number of biological factors. Sound impending on the ear drum (tympanic membrane) is translated mechanically to an organ in the inner ear called the cochlea. The cochlea helps translate and transmit the sound to the auditory nerve, which in turn connects to the brain. The cochlea is essentially a "spectrum analyzer," converting the time domain signal into a frequency domain representation. The cochlea works on a perceptual scale and not a linear frequency scale.

Typically, frequency domain transforms (such as the Fourier transform) work on a linear scale (e.g., 5–10–15–20–25–30) with the filter bandwidth constant. The human auditory system's perceptual scale is closer to a logarithmic scale (e.g., 1–2–4–8–16–32) and the filter bandwidth increases with frequency.

Embodiments of the invention may include perceptual scale transforms that use filter banks of "constant-Q" bandwidth. This means that the ratio of the filter bandwidth to filter center frequency remains constant. For instance, a Q of 0.1 would mean that for a 1000 Hz center frequency, the bandwidth would be 100 Hz (100/1000=0.1). But for a 5000 Hz center frequency, the bandwidth increases to 500 Hz.

Since humans hear along a perceptual scale, it means that they have better resolution at lower frequencies (where the bandwidth is smaller) and poorer resolution at high frequencies (where the bandwidth is larger). Audio compression techniques can use this representation in order to exploit factors in psychoacoustics and perception.

Figure 2:
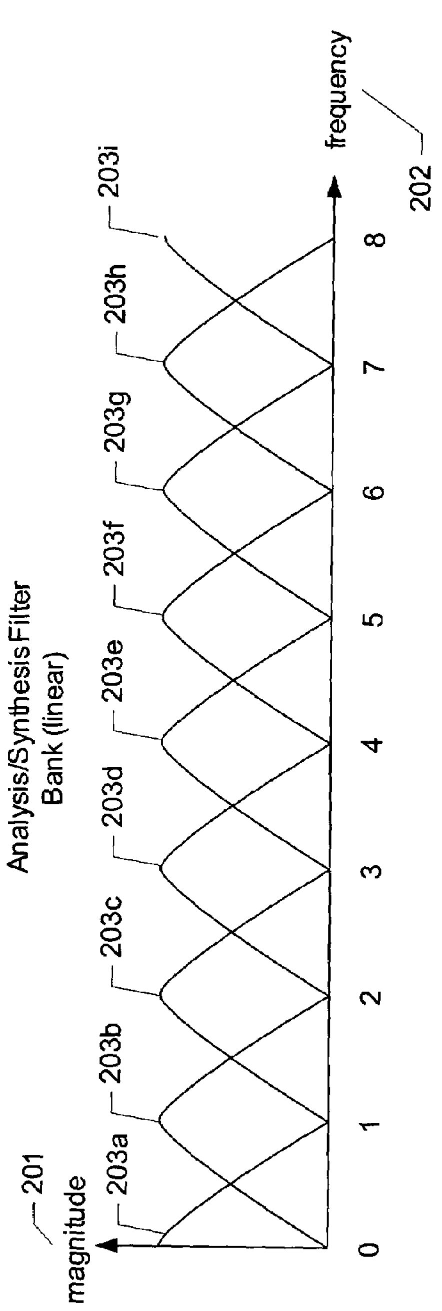
FIG. 2 shows a linear analysis/synthesis filter bank set of outputs.

FIG. 2 shows a linear analysis/synthesis filter bank set of outputs. The outputs are shown on a scale of magnitude 201 versus frequency 202. As shown, outputs of the various filters 203*a*–203*i* are spaced linearly across the frequency scale 202.

Figure 3:
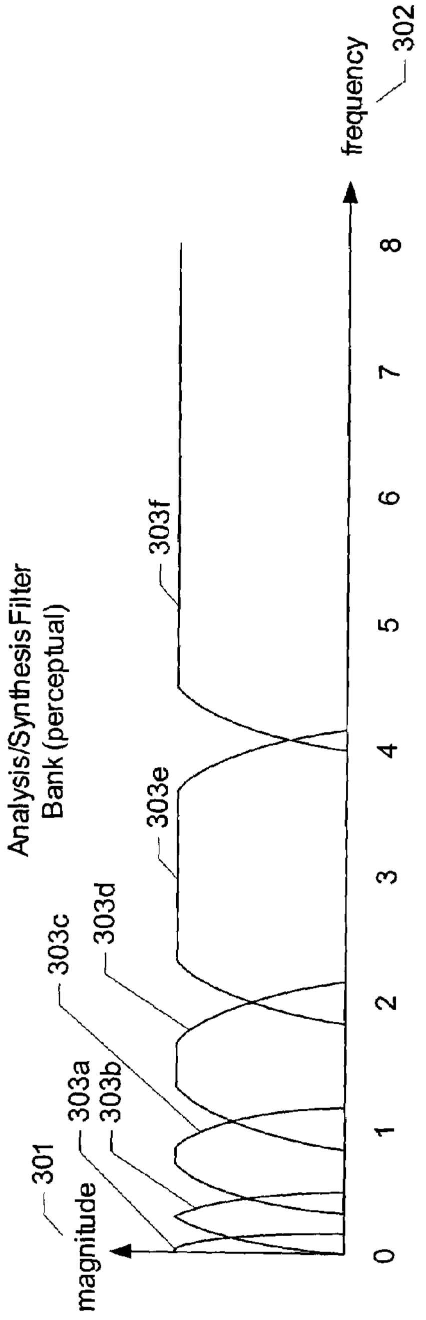
FIG. 3 shows a perceptual analysis/synthesis filter bank set of outputs.

FIG. 3 shows a perceptual analysis/synthesis filter bank set of outputs. The outputs are shown on a scale of magnitude 301 versus frequency 302. As shown, the outputs of the bank of filters 303*a*–303*f* are not linearly spaced on the frequency scale. Rather, the outputs are spaced in accordance with an example of a perceptual scale. More filter outputs are present in the portion of the frequency scale where the ear has greater sensitivity, on the lower range of this scale, as shown, for example, by the portion of the scale with the relatively closely spaced outputs 303*a*, 303*b* and 303*c*. Fewer filter outputs are present in the portion of the scale in which the ear has less sensitivity, as shown, by example, by the portion of the scale with the relatively more broadly spaced outputs 303*e* and 303*f*.

As each frame of time domain data comes in, it is converted to the frequency domain, represented as a vector of magnitudes, in which each magnitude corresponds to a frequency. For instance, if a Fourier transform is used, there will be N points in the transform, corresponding to a linear spread of frequencies related to the sampling rate. For example, as each frame of time domain data comes in, it is converted to the frequency domain via the STFT, and represented as a complex vector: (real+imaginary) or (magnitude+phase). There will be N points in the transform, corresponding to a linear spread of frequencies related to the sampling rate. The magnitude and the phase are processed. From the complex vector, the magnitude and phase are separated into two vectors. The vector of magnitude is used, each point corresponding to a magnitude at a specific frequency.

Figure 4:
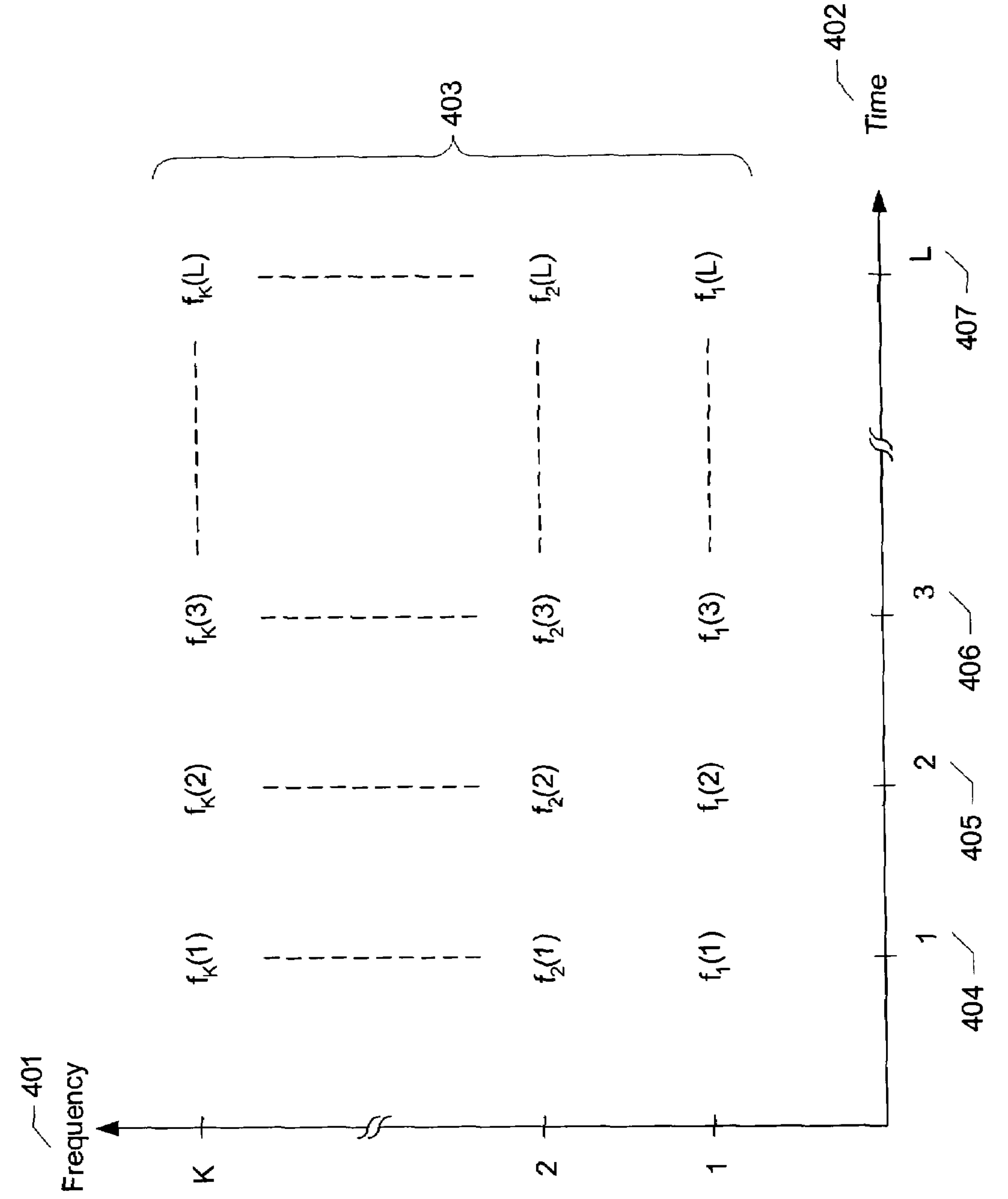
FIG. 4 shows a transformation of an input signal, for a series of frames, into the vectors in the frequency domain for each frame.

FIG. 4 shows a transformation of an input signal, for a series of frames, into magnitude vectors in the frequency domain for each frame. The frequency domain magnitude values 403 are shown on the scale of frequency 401 versus time 402. Shown are vectors for time slots 1, 2 and 3 (labeled 404, 405 and 406) through time slot 11 (labeled 407). Each time slot represents a frame of data. Each value $f_K(x)$ represents a magnitude value for a particular time slot x, for a particular frequency K. The values shown at 403 are magnitude values in the frequency domain. The noise estimate is a vector of minimum magnitude values for each frequency, across the time slots. For example, this may be represented as noise estimate $$N_K(L)=\text{minimum}\ \{f_K(1), f_K(2), \ldots, f_K(L)\}.$$

Figure 5:
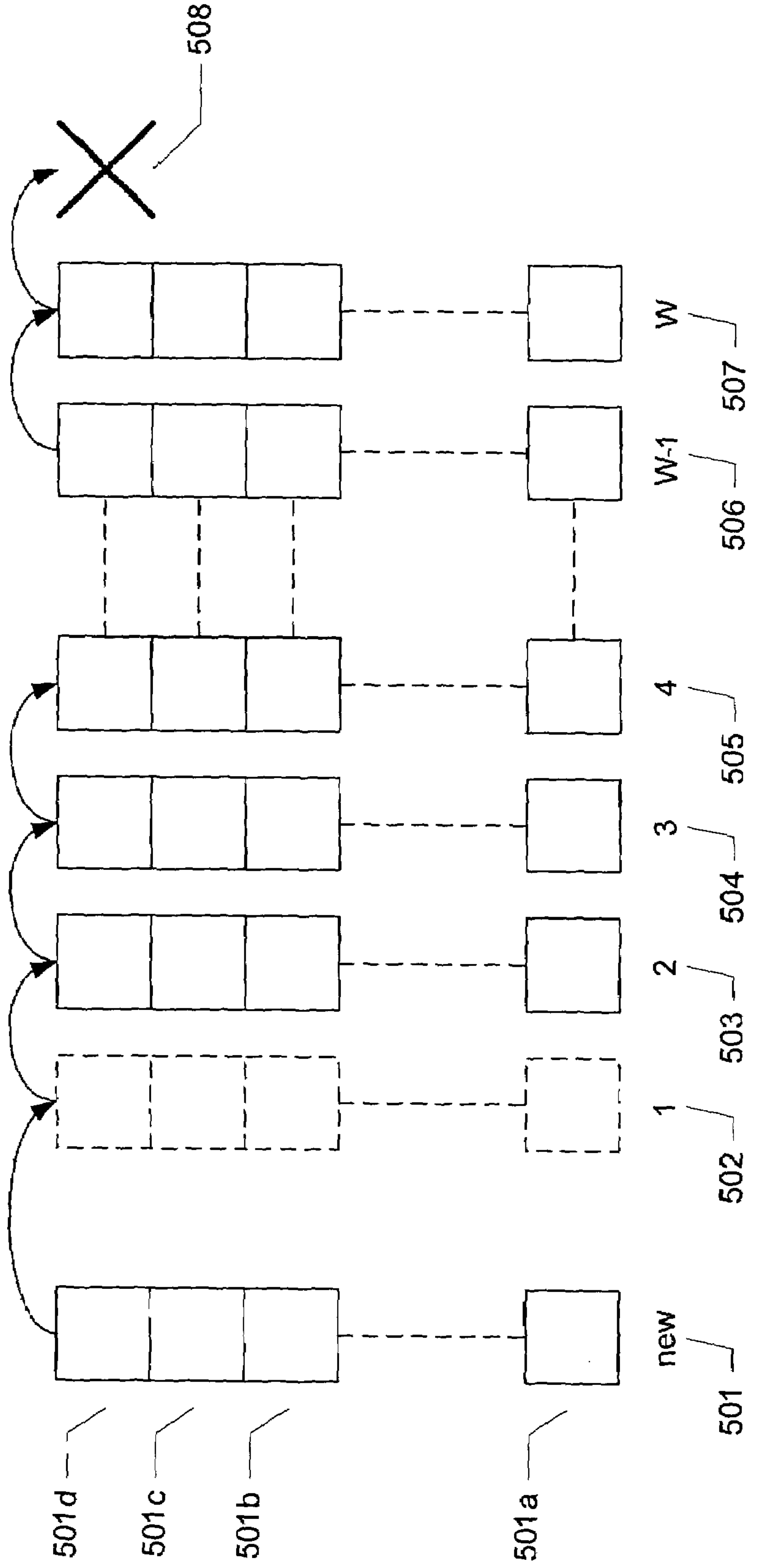
FIG. 5 shows a set of W frames of magnitude vectors, according to an embodiment of the invention.

FIG. 5 shows a set of W frames of magnitude vectors, according to an embodiment of the invention. Shown in FIG. 5 are frames 501–507. The newest frame is frame 501. The oldest frame is frame W 507. Each frame includes magnitude values for various frequencies 1 through N, for example, values 501*a*–501*d*. As each magnitude vector comes in, it is weighted (with respect to the previous frame) then stored in the matrix of W magnitude vectors. W corresponds to the number of frames to be stored. As each new vector comes in, the matrix is permutated so that the last $W^{th}$ vector 507 is discarded (shown by movement to location "X" 508), the $(W-1)^{th}$ vector 506 is moved into the $W^{th}$ spot, the $(W-2)^{th}$ vector is moved to the $(W-1)^{th}$ spot, etc. This permutation may be referred to as a circular shift. Finally, the newest vector is stored in the first spot.

Next, a searching algorithm is used to find the minimum value along frames at a given frequency. At the $N^{th}$ frequency, the minimum is found across all W frames. Then the minimum for the $(N-1)^{th}$ frequency is found across all W frames. This continues until the $1^{st}$ frequency, at which point there is a vector of minimums. This vector will be the estimate of the noise contained in the audio signal.

Figure 6:
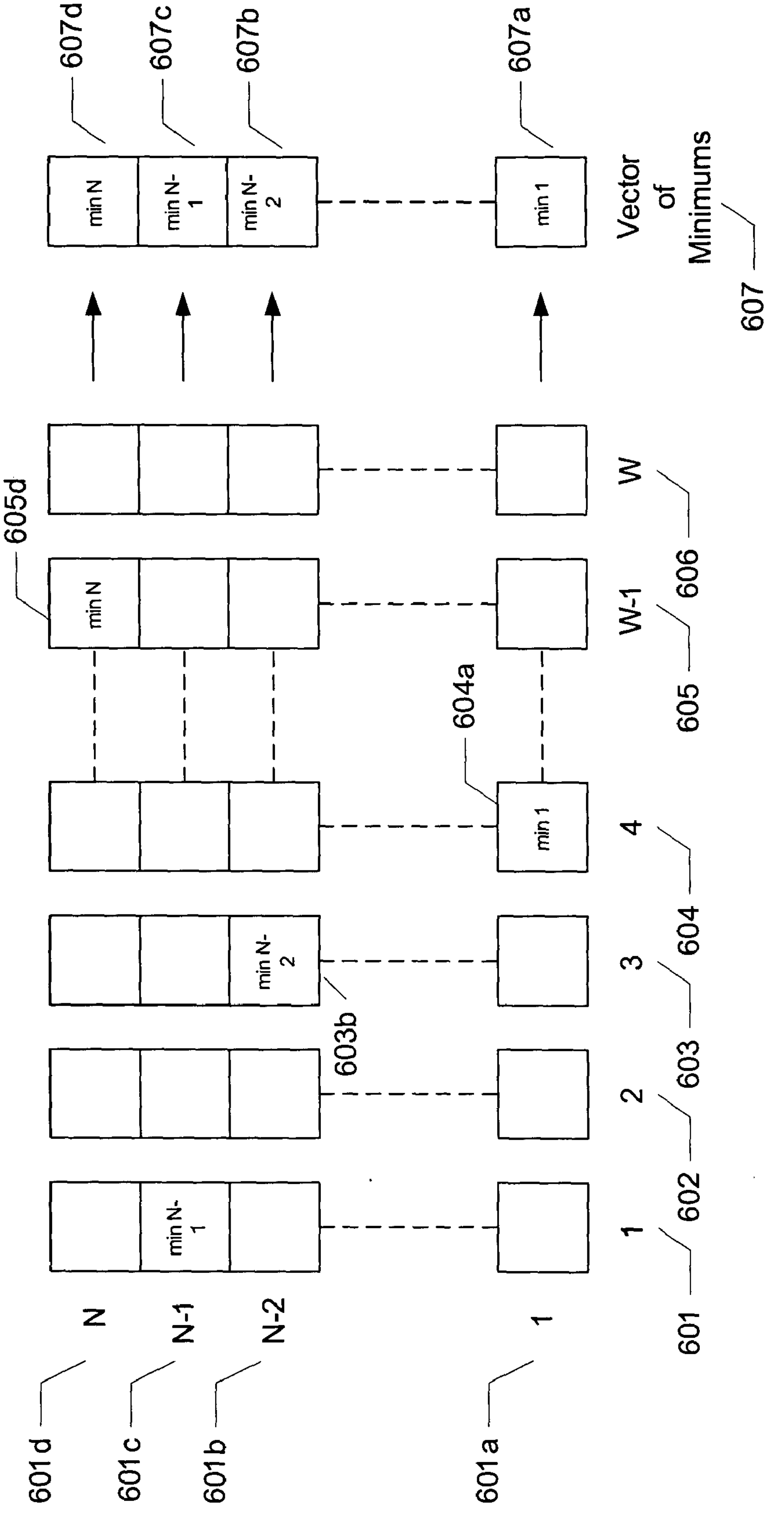
FIG. 6 shows a matrix of W magnitude vectors and a vector of minimums, according to an embodiment of the invention.

FIG. 6 shows a matrix of W magnitude vectors and a vector of minimums, according to an embodiment of the invention. For example, magnitude vectors 1 through W are shown as vectors 601–606. The vector of minimums 607 is also shown. Each vector is a matrix of magnitude values for different respective frequencies. For example, vector 601 includes magnitude values for frequency 1 601*a*, frequency N-2 601*b*, frequency N-1 601*c* and frequency N 601*d*. The vector of minimums may contain minimums selected from different time slots for the different respective frequencies. For example, the minimum min 1 607*a* for frequency 1 is magnitude 604*a*, obtained from vector 604 for time slot 4. The minimum min 2 607*b* for frequency N-2 is magnitude 603*b*, obtained from the vector 603 for time slot 3. The minimum min N-1 607*c* for frequency N-1 is magnitude 601*c*, obtained from vector 601 for time slot 1. The minimum min N 607*d* for frequency N is obtained from vector 606 for time slot W.

Figure 7:
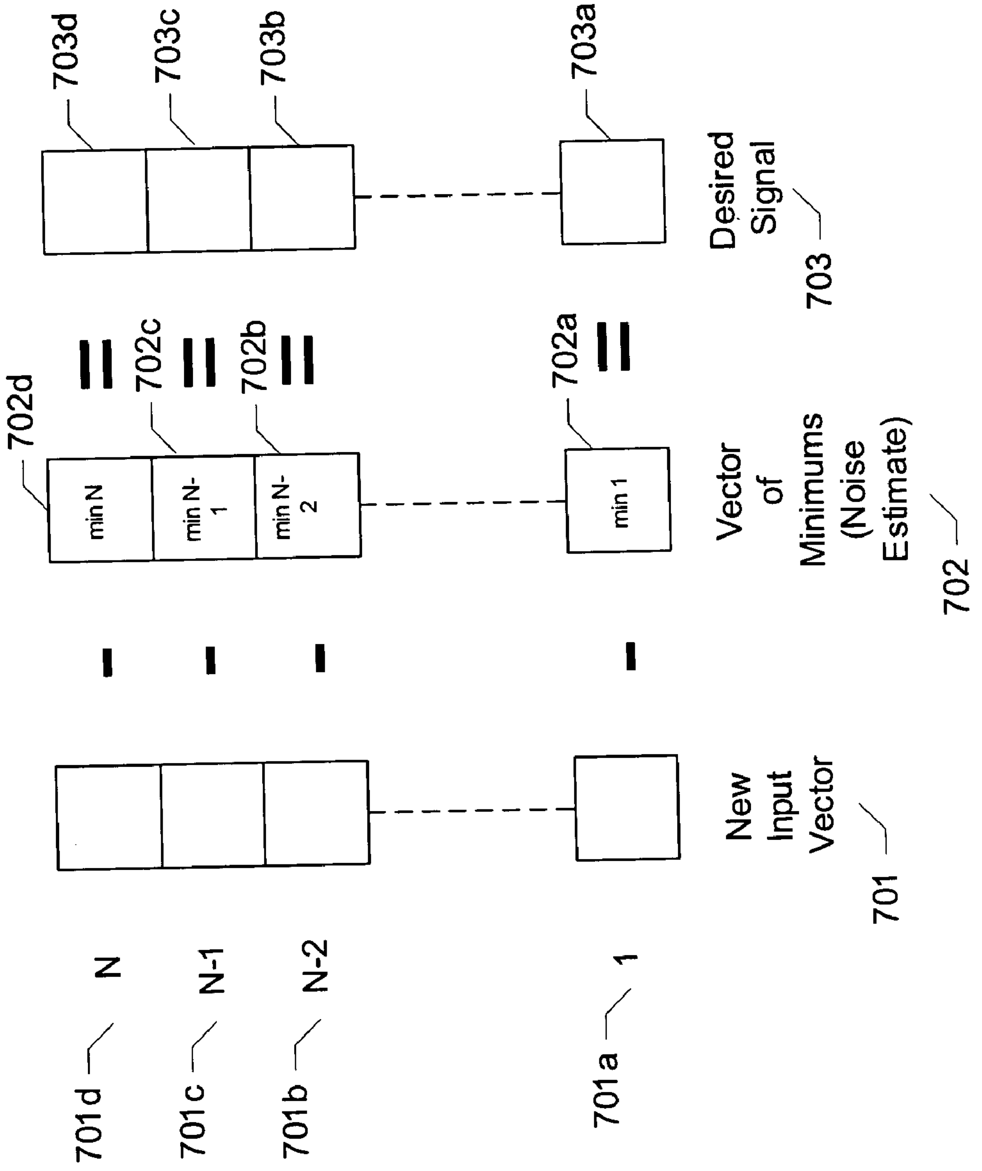
FIG. 7 shows a subtraction of a vector of minimums from a new vector input according to an embodiment of the invention.

The vector of minimums is subtracted from the new inputs to produce an output of the desired signal. FIG. 7 shows a subtraction of a vector of minimums from a new vector input, according to an embodiment of the invention. Included in FIG. 7 are new vector input 701, vector of minimums 702 and desired signal 703. New vector input 701 includes magnitude values for frequency 1 through N as represented by 701*a*–*d*. Vector of minimums 702 includes magnitude values for estimates of the noise for frequencies

1 through N as represented by 702*a–d*, and desired signal 703 includes magnitude values for the desired signal for frequencies 1 through N as represented by 703*a–d*. For each magnitude value in new input vector 701, the magnitude value from the vector of minimums 702 for the respective frequency is subtracted to yield the corresponding portion of the desired signal 703 for the respective frequency. For example, magnitude value 702*a* for the noise estimate for frequency 1 is subtracted from magnitude value 701 a for frequency 1 to yield the corresponding portion of desired signal for frequency 1 703*a*. Similarly, magnitude values 703*b–d* of desired signal 703 represent the subtracted results of a new input vector 701 minus vector of minimums 702.

Thus, the set of minimum magnitude frequency domain values is subtracted from the audio signal in frequency domain, for a particular frame of time. The subtraction takes place on a frequency-by-frequency basis. At each of the N frequency points in the current frame, the corresponding point in the noise estimate (the vector of minimums) is subtracted. What remains is the desired signal, minus the noise, for that frequency point. This is repeated for all N frequency points.

Figure 8A:
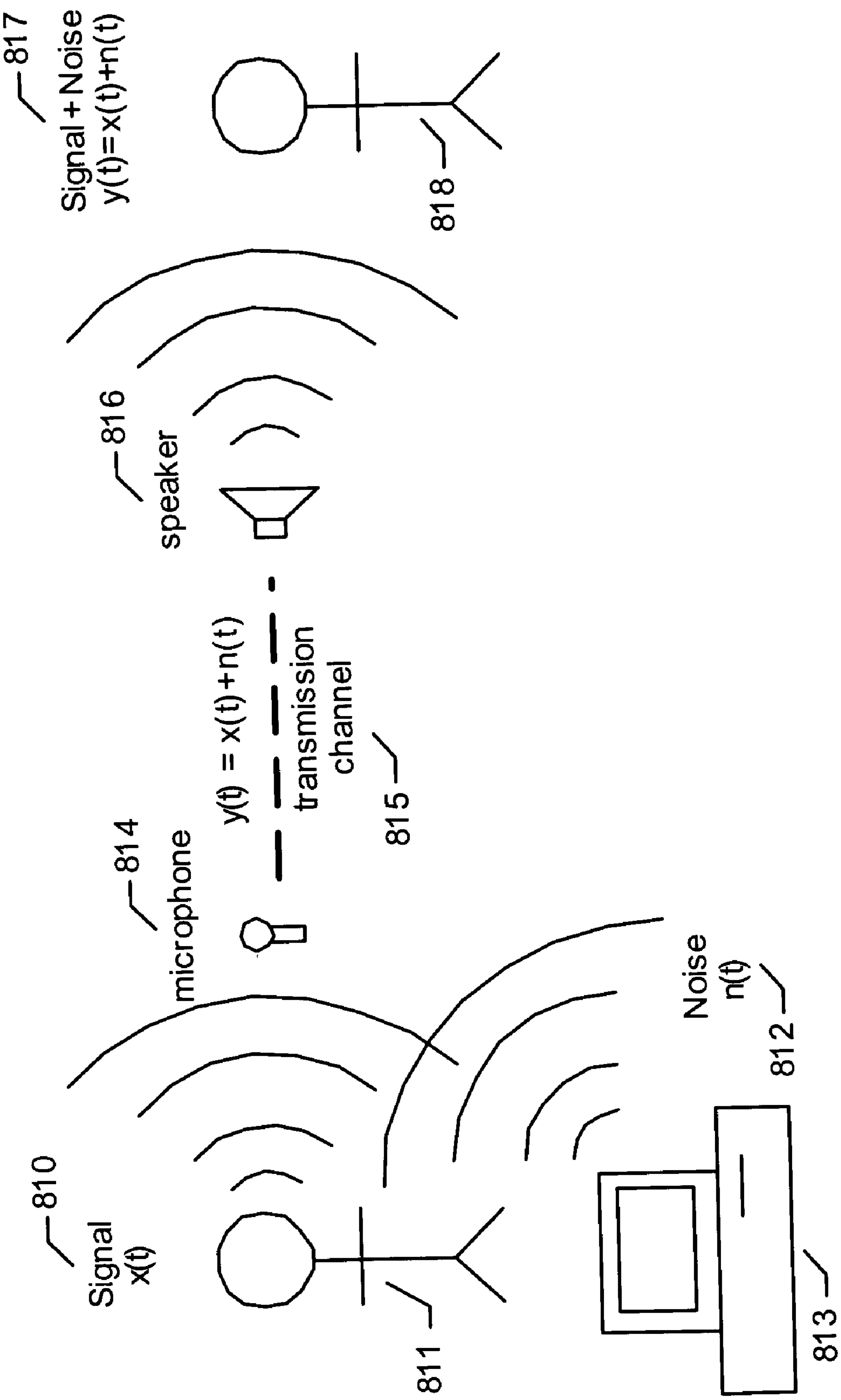
FIGS. 8*a* and 8*b* show a system producing sound from a person speaking in a room.
Figure 8B:
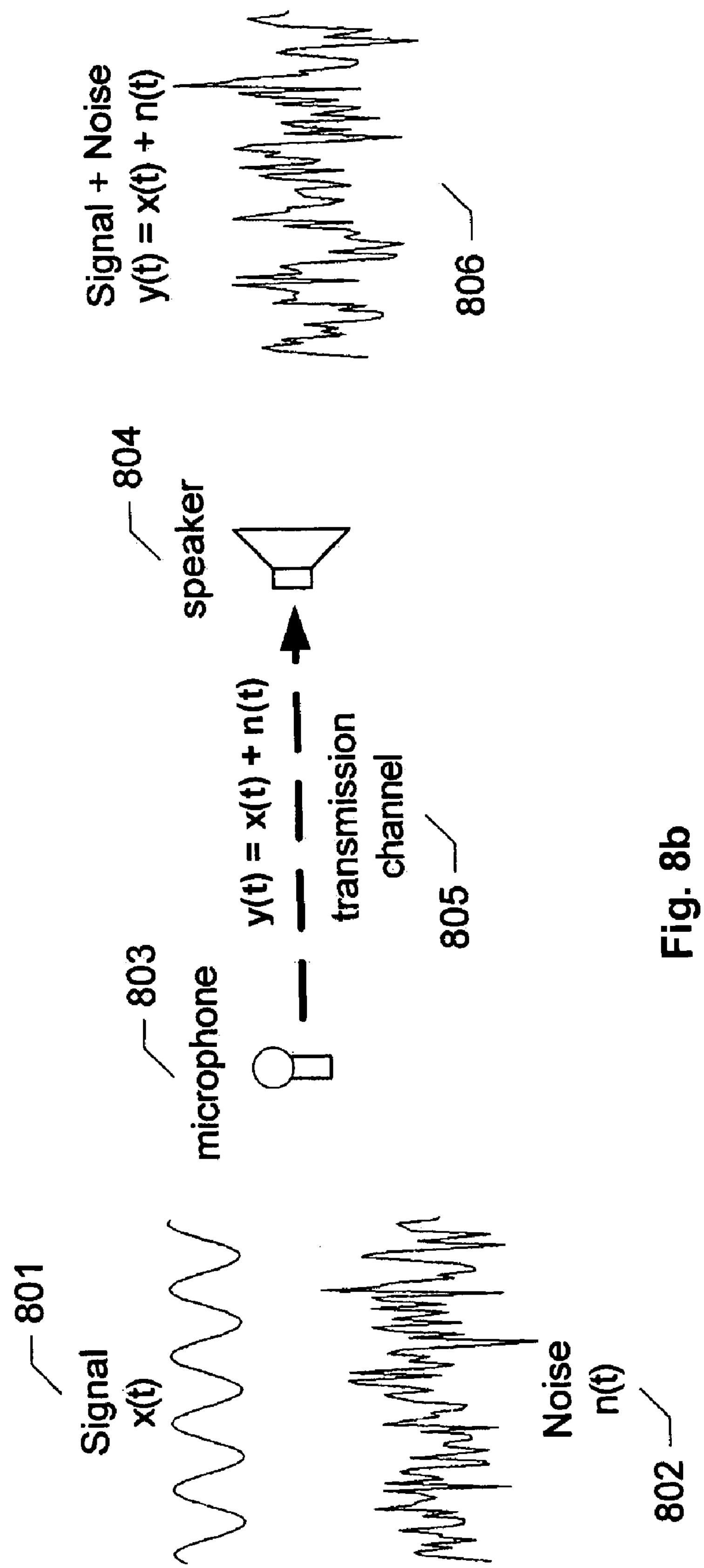

The following is an example of how the set of minimums works. See FIGS. 8*a* and 8*b*. A person 810 may be speaking in a room. There is also a constant noise source, such as the fan in a computer 813. When the speech 814 and noise 812 are combined, the input is signal+noise. When the speaker pauses, the input is just noise. The noise represents the minimum. However, the person does not have to actually stop speaking for the vector of minimums to be formed because the vector is formed from a collection of minimums across all frames. As shown in FIG. 8*a*, transmission channel 815 includes signal y(t)=x(t)+n(t). The signal x(t) 810 and noise(t) 812 are both incident upon microphone 814. The combined signal is output by speaker 816 to a listener 818. This output includes signal+noise, y(t)=x(t)+n(t) 817. FIG. 8*b* shows signal 801 and noise 802 incident upon microphone 803 and resulting in signal+noise (y(t)=x(t)+n(t)) 806 produced by speaker 804.

Figure 9:
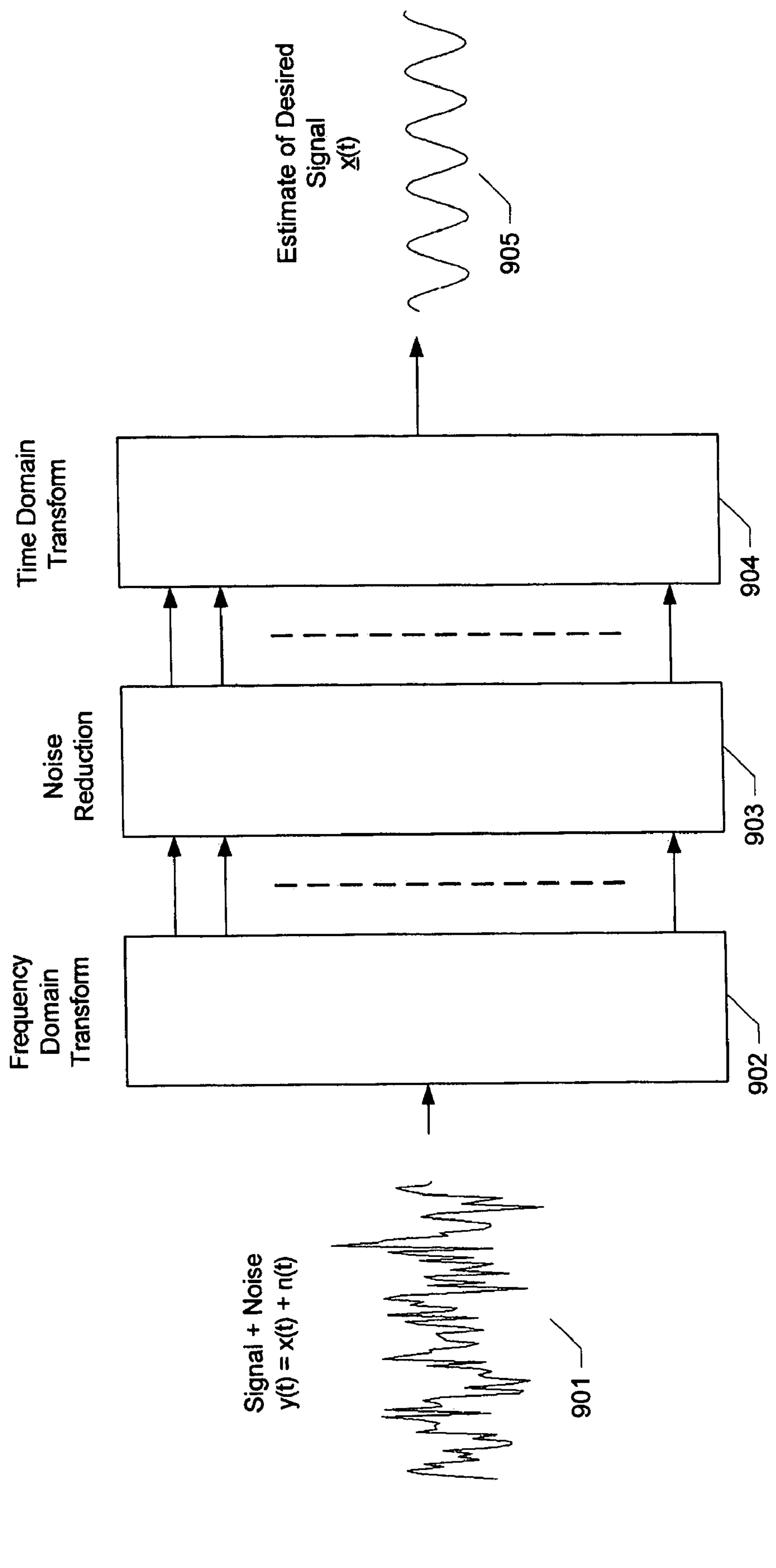
FIG. 9 shows a noise reduction system according to an embodiment of the invention.

FIG. 9 shows a noise reduction system according to an embodiment of the invention. Included are frequency domain transform block 902, noise reduction block 903 and time domain transform block 904. Incident upon frequency domain block 902 is signal+noise 901, and estimate of desired signal 905 is produced by time domain transform block 904. Frequency domain transform 902 is coupled into noise reduction block 903, and noise reduction block 903 is coupled into time domain transform block 904.

The system of FIG. 9 works as follows according to an embodiment of the invention. The signal+noise 901 is received by frequency domain transform 902. Frequency domain 902 converts signal+noise (y(t)=x(t)+n(t)) to the frequency domain. Such conversion is performed on a perceptual scale, according to an embodiment of the invention. Then, noise reduction is applied to the result of the frequency domain transform and noise reduction block 903. Noise reduction involves determining a vector of minimums, and subtracting this vector of minimums from the signal+noise, to form an estimate of the original signal without noise. Time domain transform block 904 operates on the result of this noise reduction block. Time domain transform block 904 converts the output of noise reduction block 903 back to the time domain. The resulting converted signal is output $\underline{x}(t)$ 905, which is an estimate of the desired signal x(t).

Because the signal minus the noise estimate may result in a negative number, which is undefined in the frequency domain, the result is typically set to zero or greater when a negative number occurs. The subtracted audio signal is converted to time domain, and the converted audio signal is output.

According to one embodiment, the noise estimate is multiplied by a gain factor greater than unity, before the subtraction. Thus, the noise estimate is "over-subtracted" according to an embodiment of the invention. This method tends to aggressively remove the noise. The subtracted audio signal is compared to a threshold, where the threshold is related to an attenuated version of the original audio signal, and the greater of the subtracted audio signal and the threshold is used for the conversion to the time domain.

According to another embodiment of the invention, the subtracted audio signal is modified in a non-linear fashion, by exponentially increasing its magnitude, in order to sharpen the spectral maximums and reduce the spectral minimums. For example, the values are squared (power of two). Since the values go from 0 to 1, the result is a number from 0 to 1 ($1^2$=1, $0.5_2$=0.25, etc.). This "sharpens" the spectrum, making the peaks sharper, the spectral valleys deeper.

The gain factor applied may be determined manually. Alternatively, it can be determined by observing the ratio of the signal's frequency domain values to the minimum magnitude frequency domain values at each frame, applying larger gain values at lower ratios. This is a way of determining the gain value needed, based on the signal-to-noise estimate ratio. If the noise-estimate is low, then the sound is not badly corrupted, and so it is desirable that the subtraction is not too heavy. If the noise-estimate is high, the signal-to-noise ratio is low, and a goal is to subtract a larger representation of the noise.

Figure 10:
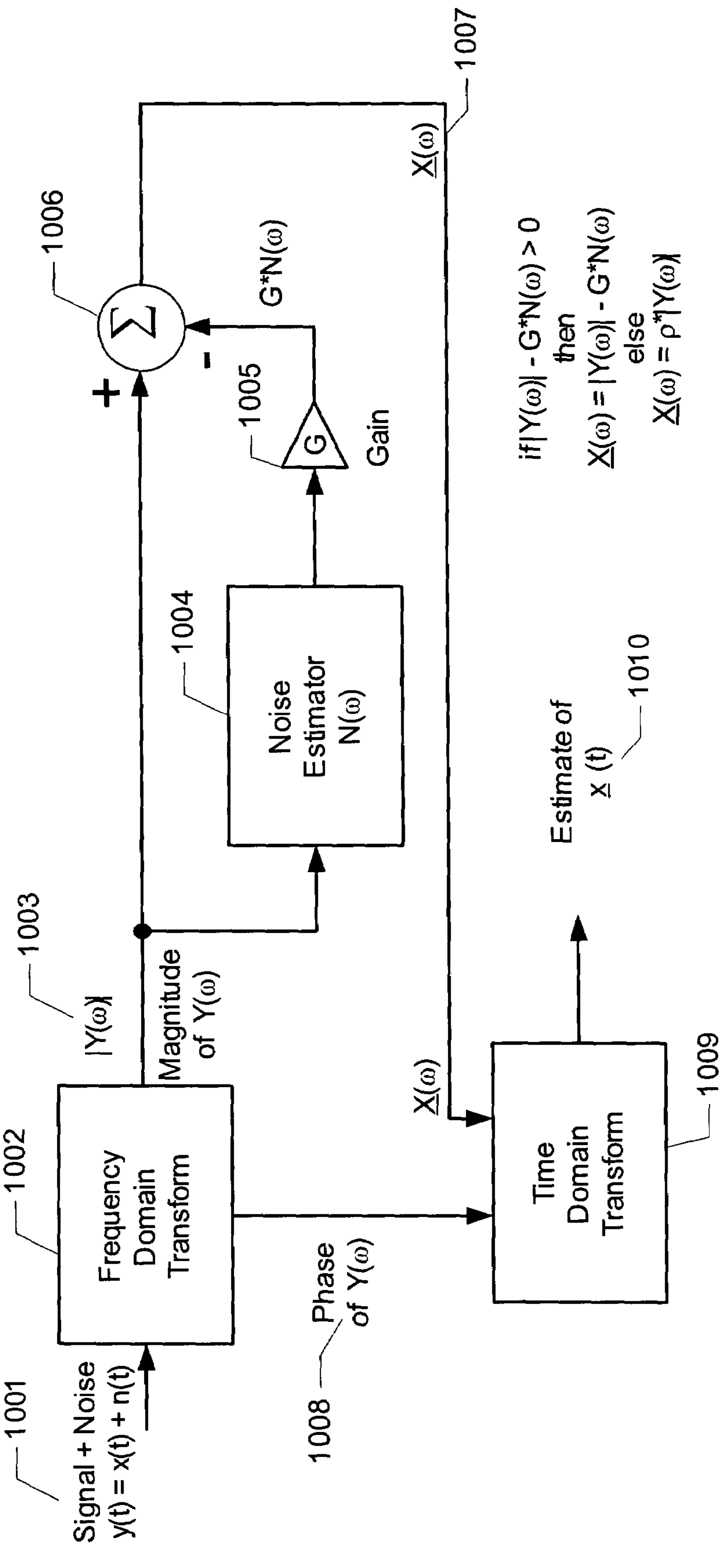
FIG. 10 shows a noise reduction system with gain on the output noise estimator, according to an embodiment of the invention.

FIG. 10 shows a noise reduction system with gain on the output noise estimator, according to an embodiment of the invention. The system includes frequency domain transform block 1002, noise estimator block 1004, gain block 1005, summation block 1006, and time domain transform block 1009. Also shown are signal+noise 1001, frequency domain magnitude |Y(ω)| 1003, frequency domain estimate of the magnitude of signal X(ω) 1007 and time domain estimate of the signal $\underline{x}(t)$ 1010. The input of frequency domain transform block 1002 is configured to receive signal+noise 1001, and the magnitude output of frequency domain transform block 1002 is coupled to the input of noise estimator block 1004 and the positive input of summation block 1006. The output of noise estimator block 1004 is coupled into input of gain block 1005, and output of gain block 1005 is coupled to the negative input of summation block 1006. The output of summation block 1006 is coupled to the input of time domain transfer block 1009, and the phase output of frequency domain transform block 1002 is also coupled to the input of time domain transform block 1009.

Signal+noise 1001 is received by frequency domain transform 1002, and frequency domain transform block 1002 transforms signal+noise 1001 into frequency domain magnitude value |Y(ω)| 1003 and phase 1008 of Y(ω). Noise estimator 1004 makes an estimate of the noise by forming a vector of minimums. The noise estimate is represented by N(ω). The noise estimate is multiplied by a gain factor G in gain block 1005. Noise N(ω) times gain G is subtracted from frequency domain magnitude |Y(ω)| 1003 in summation block 1006. The result is an estimate $\underline{X}(\omega)$ 1007 of the magnitude of the original signal x(t). This value $\underline{X}(\omega)$ 1007 is combined with phase Y(ω) 1008 from frequency domain transform block 1002 in time domain transform block 1009. Time domain transform block 1009 then converts these inputs back into a time domain value $\underline{x}(t)$ 1010, which is an estimate of the signal without noise.

According to one embodiment of the invention, the subtracted audio signal is compared to a threshold which is greater than zero. The threshold is related to a scaled version of the original audio signal, and the greater of the subtracted audio signal and the threshold is used for the conversion to the time domain. This helps to make sure that the signal minus noise is not a negative number (there are only positive magnitudes—the phase determines if it's negative or somewhere in between). The threshold can just be zero, or it can be a scaled version of the input (for example, 0.01*input_signal, or ρ*input_signal, p<<1). Then if (at any given frequency) the subtracted signal is below 0.01*input_signal or ρ*input_signal, ρ<<1, the reduced input signal is used. The reduced input signal is a quiet version of the input, at that frequency. The effect is that, as the scaling factor is made larger, the listener starts to hear more of the original noise.

Figure 11:
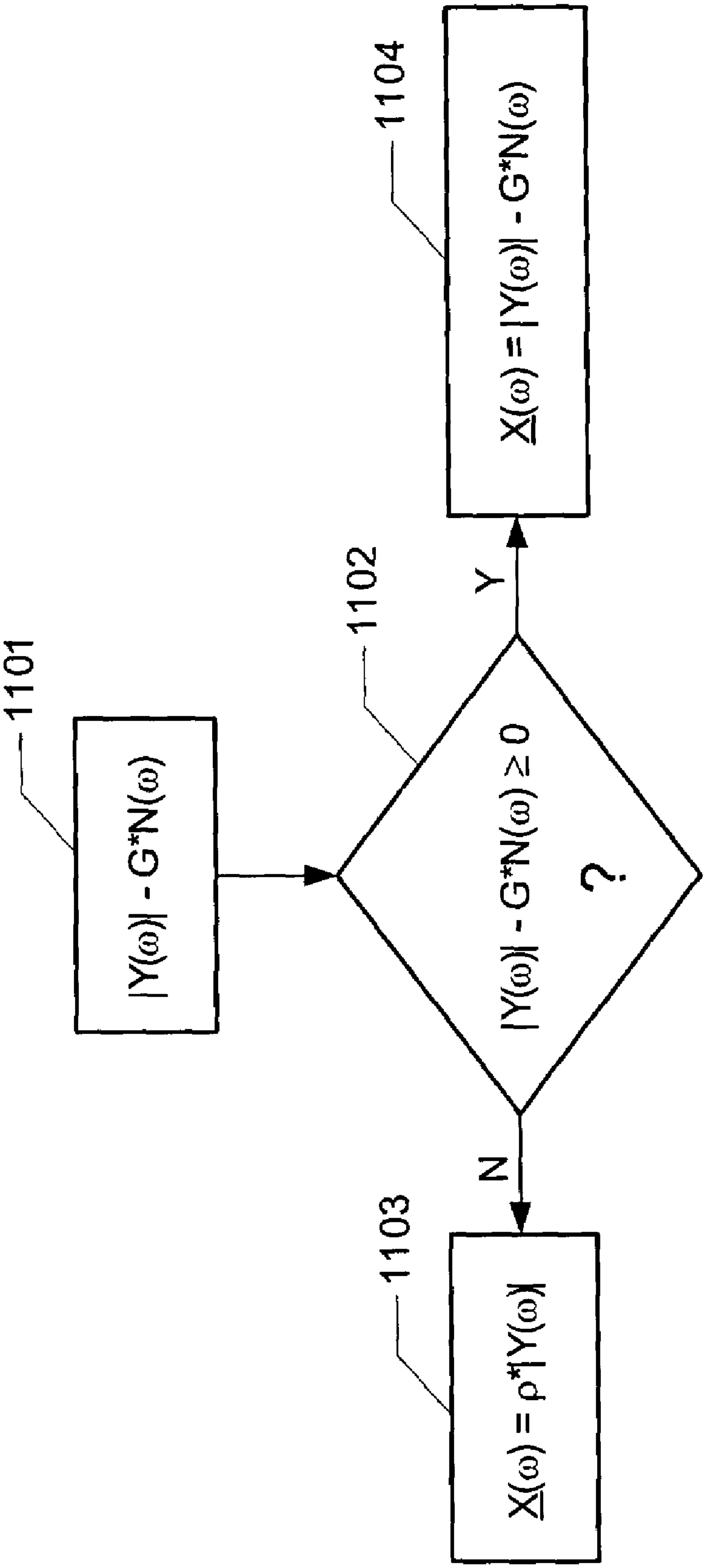
FIG. 11 shows a method of selecting between values based on a threshold, according to an embodiment of the invention.

FIG. 11 shows a method of selecting between values based on a threshold, according to an embodiment of the invention. An estimate of the noise $N(\omega)$ times a gain factor G is subtracted from the magnitude of the input in the frequency domain $|Y(\omega)|$ (block 1101). If this value is greater than or equal to 0 (decision block 1102), then the estimate of the signal formed by subtracting the magnitude of the signal+noise and the time domain $|Y(\omega)|$ from $G*N(\omega)$ is used, i.e., $\underline{X}(\omega)=|Y(\omega)|-G*N(\omega)$ (block 1104). This means that signal minus noise is not a negative number. Otherwise, the estimate of the original signal is formed by a factor ρ times the magnitude of the signal+noise and the frequency domain $|Y(\omega)|$ is used to form an estimate of the signal, i.e., $\underline{X}(\omega)=\rho*|Y(\omega)|$ (block 1103).

Once the final estimate of the relatively clean signal is made, the magnitude vector is combined with the phase of the original input signal, and then an inverse frequency transform is performed. If the input signal was previously transformed into the frequency domain, it is then converted back to the time domain. The signal is then back in the time domain.

An embodiment of the invention is used for a single channel of audio. However, when two or more channels are used, and the noise in the channels is well correlated, the noise estimate from one channel may be used for the other channels. This procedure can help save processor cycles by only tracking noise from a single channel. If the channels are not well correlated, then the method can be applied independently to each channel.

Implementations in digital signal processors may be provided according to various embodiments of the invention. Digital implementation can be accomplished on both fixed and floating point DSP hardware. It can also be implemented on RISC or CISC based hardware (such as a computer CPU). The various blocks described may be implemented in hardware, software or a combination of hardware and software. Programmable logic may also be used, including in combination with hardware and/or software.

Figure 12:
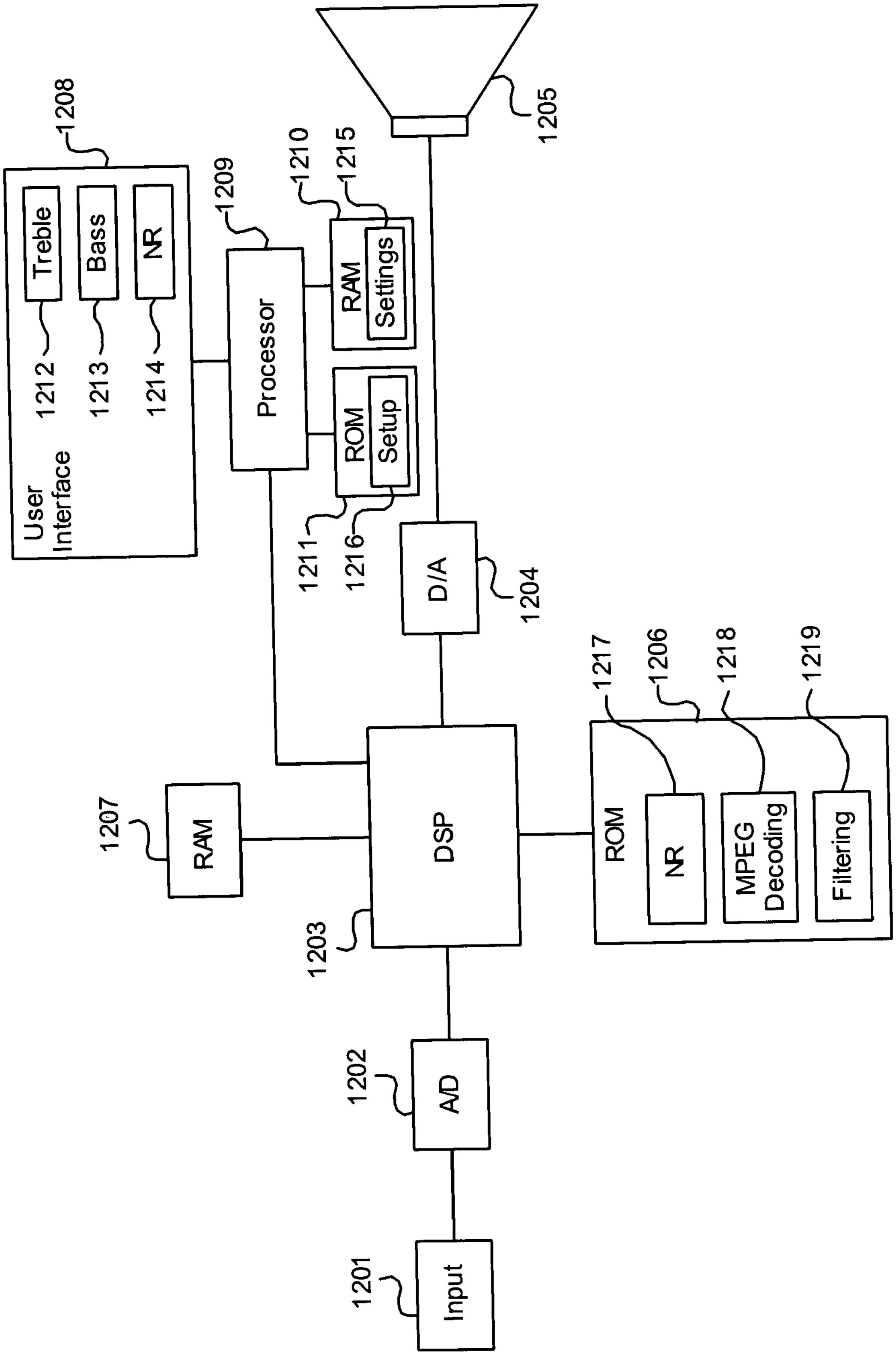
FIG. 12 is a block diagram of a system with a digital signal processor, according to an embodiment of the invention.

FIG. 12 is a block diagram of a system with a digital signal processor, according to an embodiment of the invention. The system includes input 1201, analog-to-digital converter 1202, digital signal processor (DSP) 1203, digital-to-analog converter 1204 and speaker 1205. Additionally, the system includes RAM 1207 and ROM 1206. Also included are processor 1209, user interface 1208, ROM 1211 and RAM 1210. ROM 1206 includes noise reduction code 1217, MPEG decoding code 1218 and filtering code 1219. ROM 1211 includes setup code 1216, and RAM 1210 includes settings 1215. User interface 1208 includes treble setup 1212, bass setup 1213 and noise reduction setup 1214.

The system is configured as follows. Analog-to-digital converter (A/D) 1202 is coupled to receive input 1201 and provide an output to digital signal processor 1203. An output of digital signal processor 1203 is coupled to digital-to-analog converter (D/A) 1204, the output of which is coupled to speaker 1205. RAM 1207 and ROM 1206 are each coupled to digital signal processor 1203. Additionally, processor 1209, which is coupled with ROM 1211, RAM 1210 and user interface 1208, is coupled with digital signal processor 1203.

The system shown in FIG. 12 may operate as follows, according to an embodiment. Digital signal processor 1203 runs various computer programs stored in ROM 1206, such as noise reduction code 1217, MPEG decoding code 1218 and filtering code 1219. Additional programs may be stored in ROM 1206 to enable digital signal processor 1203 to perform other digital signal processing and other functions. Digital signal processor 1203 uses RAM 1207 for storage of items such as settings, parameters, as well as samples upon which digital signal processor 1203 is operating.

Digital signal processor 1203 receives inputs, which may correspond to audio signals in digital form from a source such as analog-to-digital converter 1202. In another embodiment, audio signals are received by the system directly in digital form, such as in a computer system in which audio signals are received in digital form. Digital signal processor 1203 performs various functions such as the processing enabled by programs noise reduction code 1217, MPEG decoding code 1218 and filtering code 1219. Noise reduction code 1217 implements an frequency domain transform, noise estimate, noise subtraction and time domain transform, according to an embodiment.

The parameters of the noise reduction code 1217 may be stored in ROM 1206. However, in an embodiment, parameters such as the strength of the noise reduction may be adjusted during operation of the system. In such instances, the adjustable parameters may be stored in a dynamically writable memory, such as in RAM 1207, according to an embodiment. Such adjustment may take place over an interface such as user interface 1208, and the corresponding parameters are then stored in the system, such as in RAM 1207. Output of digital signal processor 1203 is provided to digital-to-analog converter 1204. The output of digital-to-analog converter 1204 is in turn provided to speaker 1205.

User interface 1208 allows for a user to adjust various aspects of the system shown in FIG. 12. For example, a user is able to adjust treble, bass and noise reduction through respective adjustments: treble adjustment 1212, bass adjustment 1213 and noise reduction adjustment 1214. According to an embodiment, noise reduction adjustment 1214 comprises a simple enablement or disablement of a noise reduction feature without the ability to adjust respective parameters for noise reduction. According to another embodiment, other adjustments, such as those discussed previously, may be provided over user interface 1208 with respect to noise reduction. Processor 1209 controls user interface 1208 allowing a user to input values and make selections for items such as noise reduction input 1214. Such selections and adjustments by the user may be made by way of a user controlled pointing device in a computer system, or through other communication, such as a remote control with infrared communication in the case of a television system. Other forms of user input to the system are possible, according to other embodiments. ROM 1211, which is coupled to processor 1209, stores programs which allow for control of user interface 1208, such as setup program 1216. RAM 1210, in turn, is used by processor 1209 to store the settings selected by a user, as shown here in settings 1215.

Figure 13:
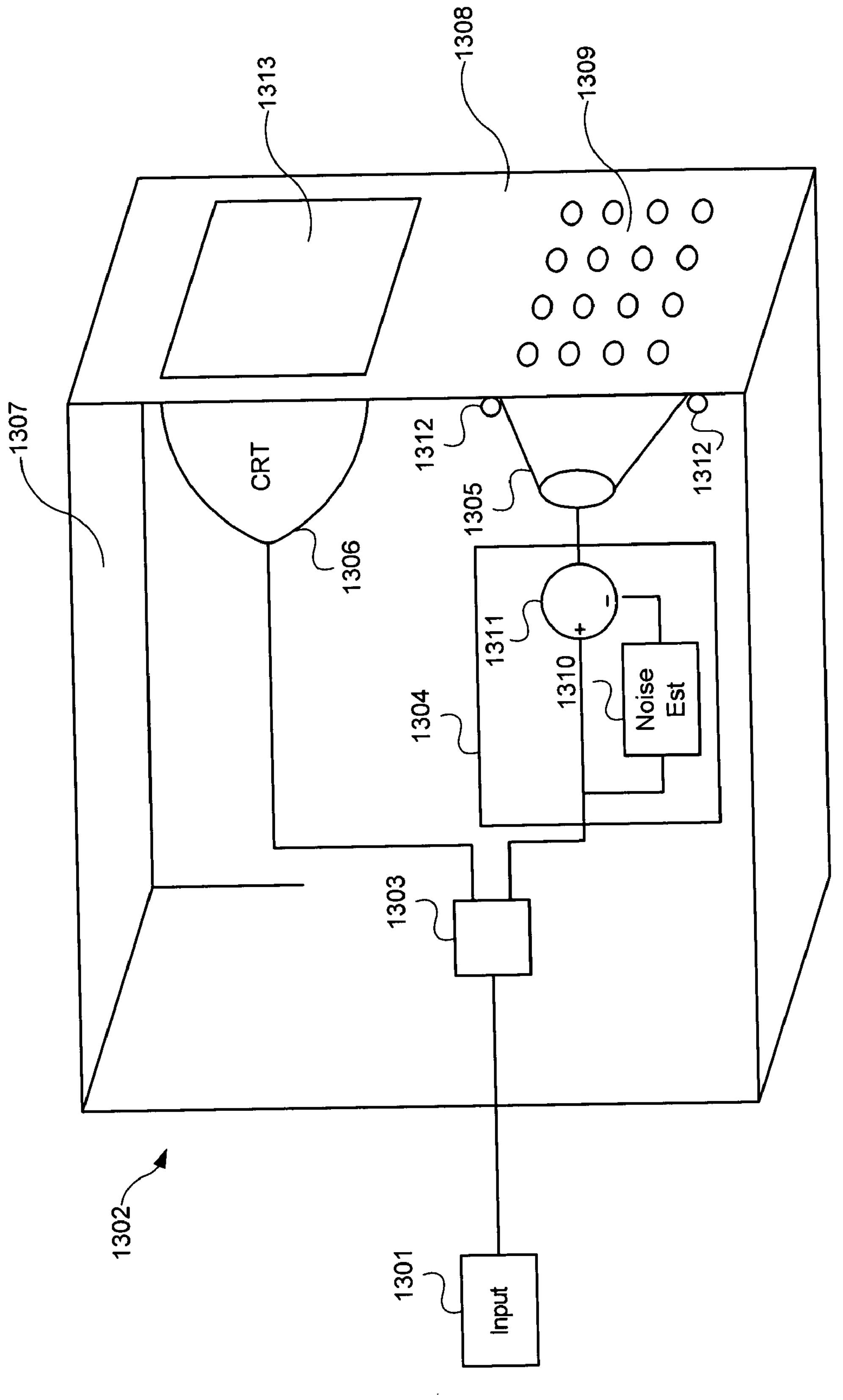
FIG. 13 is an illustrative and block diagram of a system with a CRT, according to an embodiment of the invention.

FIG. 13 is an illustrative and block diagram of a system with a CRT, according to an embodiment of the invention. The system includes an input 1301 coupled into an audio video device 1302. Audio video device 1302 may comprise a device such as a television, or alternatively, a video monitor for a computer system or other device which outputs images and sound. Audio video device 1302 includes plastic material 1307, which includes front panel 1308. Audio video system 1302 also includes splitter circuit 1303, cathode ray tube (CRT) 1306 with a display 1313, speaker 1305 and noise reduction circuit 1304. Noise reduction circuit 1304 includes noise estimator 1310 and summation 1311.

Audio video system 1302 may be configured as follows. Splitter 1303 is configured to receive input from input 1301. The input of noise reduction circuit 1304 and the input of cathode ray tube 1306 are coupled to the output of splitter 1303. The input of speaker 1305 and coupled to the output of noise reduction circuit 1304. System 1302 is housed by an enclosure comprising plastic material 1307, according to one embodiment. Speaker 1305 is connected to a front panel 1308 of system 1302 by screws 1312.

In operation, an input signal 1301, which includes both video and audio signals, is provided to system 1302. Such input 1301 is separated into separate video and audio signals at splitter 1303. The video and audio signals are provided to CRT 1306 and noise reduction circuit 1304 respectively. Additional electronics for processing the video and audio signals respectively may be included, according to various embodiments. For example, electronics for processing an MPEG signal may be included, according to an embodiment of the invention. Additionally, other electronics to provide adjustment of the respected signals and user control may be provided. For example, electronics for the configuration of volume, tuning, and various aspects of sound, quality and reception may be provided. Additionally, in an embodiment in which system 1302 comprises a television, a tuner can be provided. In such case, input 1301 may represent an input received from a broadcast of radio waves. Input 1301 may also represent a cable input, such as one received in a cable television network. According to another embodiment of the invention, CRT 1306 is replaced with a flat panel display, or other form of video or visual display. System 1302 may also comprise a monitor for a computer system, where input 1301 comprises an input from the computer.

Noise reduction circuit 1304 may be implemented in digital electronics, such as by a digital filter implemented by a digital signal processor. Such digital signal processor performs other functions in system 1302, according to an embodiment. For example, such a digital signal processor may perform other filtering, tuning and processing for system 1302. Noise reduction circuit 1304 may be implemented as a series of separate components or as a single integrated circuit, according to different embodiments.

Figure 14:
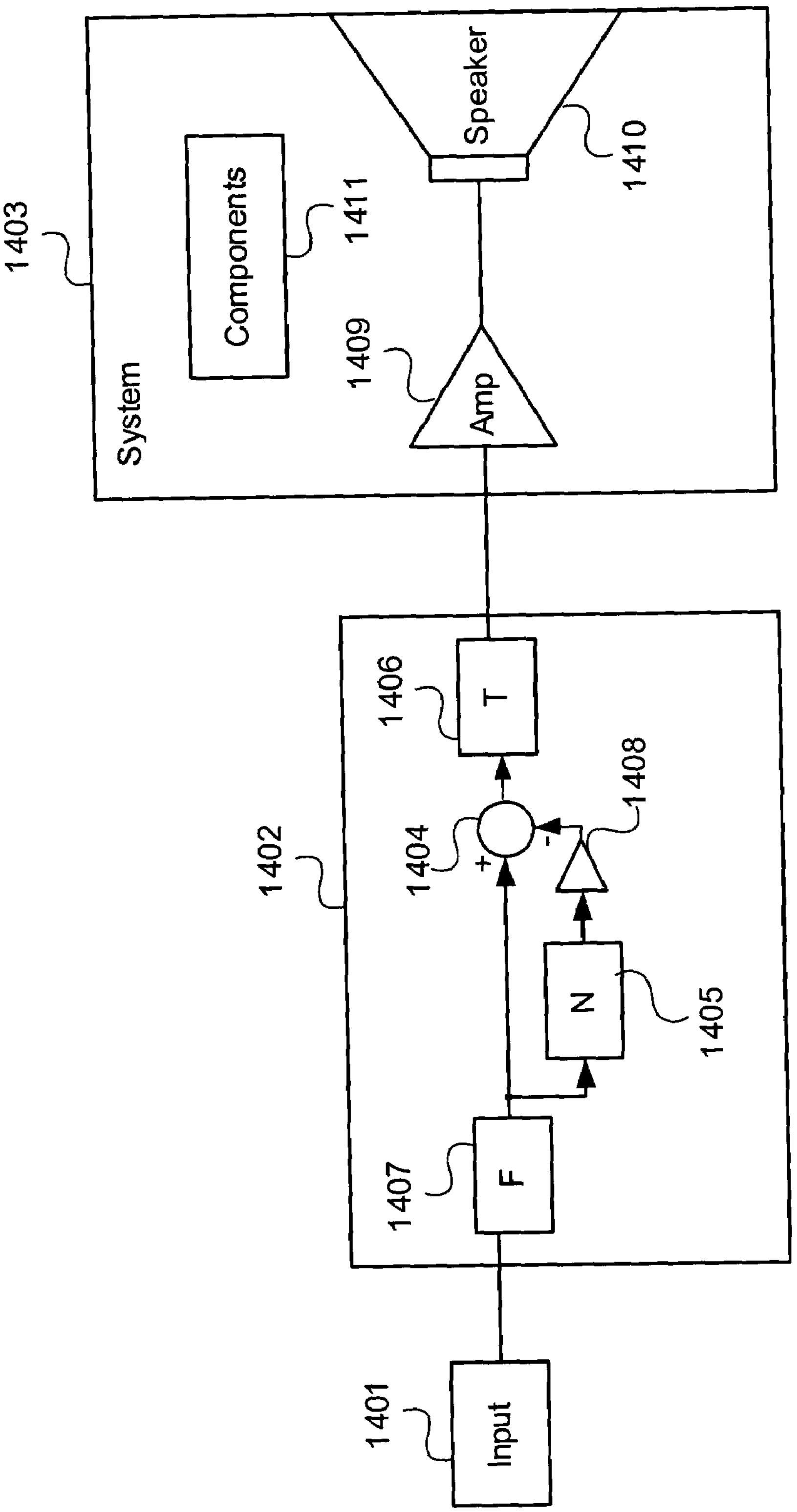
FIG. 14 is a block diagram of an audio system, according to an embodiment of the invention.

FIG. 14 is a block diagram of an audio system, according to an embodiment of the invention. Included are input 1401, noise reduction circuit 1402 and system 1403. Circuit 1402 includes frequency domain transform 1407 and time-domain transform 1406. Also included in noise reduction circuit 1402 are summation 1404, noise estimator 1407 and noise gain 1408. System 1403 includes an amplifier 1409 and speaker 1410 as well as components 1411. Components 1411 may comprise, for example, electronic communications components. For example, communications components of a mobile telephone or other wireless or other communications electronics may be included.

Items shown in FIG. 14 are connected as follows. Input 1401 is coupled with noise reduction circuit 1402, and noise reduction 1402 is coupled with system 1403. Input 1401 is received by frequency domain transform 1407. The output of frequency domain transform 1407 is provided to summation 1404, which also receives the noise estimate from 1405 with gain 1408. The output of summation 1404 is provided to time domain transform 1406, the output of which is provided to amplifier 1409, the output of which is provided to speaker 1410.

Figure 15:
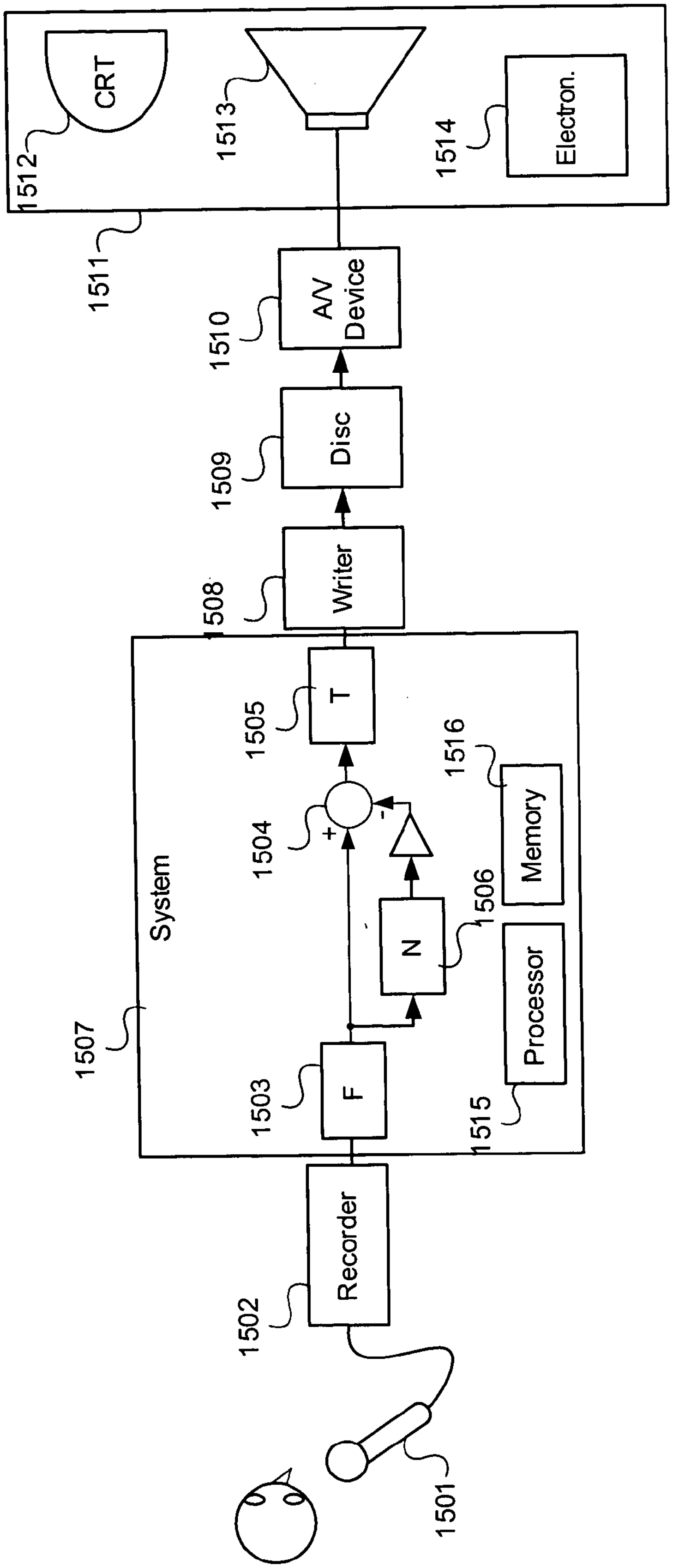
FIG. 15 is a block diagram illustrating production of media according to an embodiment of the invention.

FIG. 15 is a block diagram illustrating production of media according to an embodiment of the invention. The system includes an audio input device 1501, recorder 1502, computer system 1507, media writing device 1508 and media 1509. Also included is an audio video device 1510 coupled with an audio video system 1511. Audio video device they comprise of items such as a video recorder, DVD player or other audio video device, audio video device 1510 may be replaced with an audio device such as a compact disk or tape player. Audio video system 1511 may comprise an item such as a television, monitor, or other electronic system for playing media. Computer system 1507 includes noise reduction components such as frequency domain transform block 1503, summation block 1504, time domain transform block 1505, noise estimator block 1506, processor 1515 and memory 1516. Computer system 1507 may include a monitor, keyboard, mouse and other input and output devices. Further, computer system may also comprise a computer-based controller of large volume or other form of a media production and processing system, according to an embodiment. Audio video system 1511 includes electronics 1514, cathode ray tube 1512 and speaker 1513.

The system of FIG. 15 may be configured as follows, according to an embodiment. Input device 1501 is coupled with recorder 1502, the output of which is provided to system 1507. The output of system 1507 is provided to media writer 1508, which is operative upon media 1509. Media 1509 is provided to audio video device 1510, which is coupled with audio video system 1511. Input to system 1507 is received by frequency domain transform 1503. The output of frequency domain transform 1503 is provided to summation 1504, which also receives the noise estimate from 1506. The output of summation 1504 is provided to time domain transform 1505.

In operation, an audio signal is received in the system, is processed, and is eventually provided to speaker 1513 of audio/video system 1511. Recorder 1502 receives input from input device 1501, and records such input. The input may be converted to digital form before or after recording according to different embodiments. The output of the recorder is provided to computer system 1507. Note that according to an embodiment, input from an input device, such as input device 1501, is provided directly to computer system 1507 without a separate recorder. The audio signal is processed by components 1503, 1504, 1505, and 1506. Such components are implemented as computer instructions run by a processor 1515 and stored in a memory 1516, according to an embodiment. A phase corrected output is provided to media writer 1508, which stores a resulting phase corrected signal on storage medium 1509. Such storage medium 1509 may comprise a compact disk, DVD, flash memory, tape or other storage medium. The storage medium is then used in an audio/video device cable of reading storage medium such as storage audio/video device 1510. Such device reads media and provides an audio output to audio/video system

1511. Such output may comprise a digital signal, according to one embodiment. In such a case, a digital-to-analog converter is provided between audio/video device 1510 and speaker 1513. In another embodiment, audio/video device 1510 provides an analog signal to speaker 1513. Speaker 1513 produces sound in response to the audio signal from audio/video device 1510. Additionally, CRT 1512 may produce video output in response to a video signal. Such video signal may result from video images stored on medium 1509, according to an embodiment.

Figure 16:
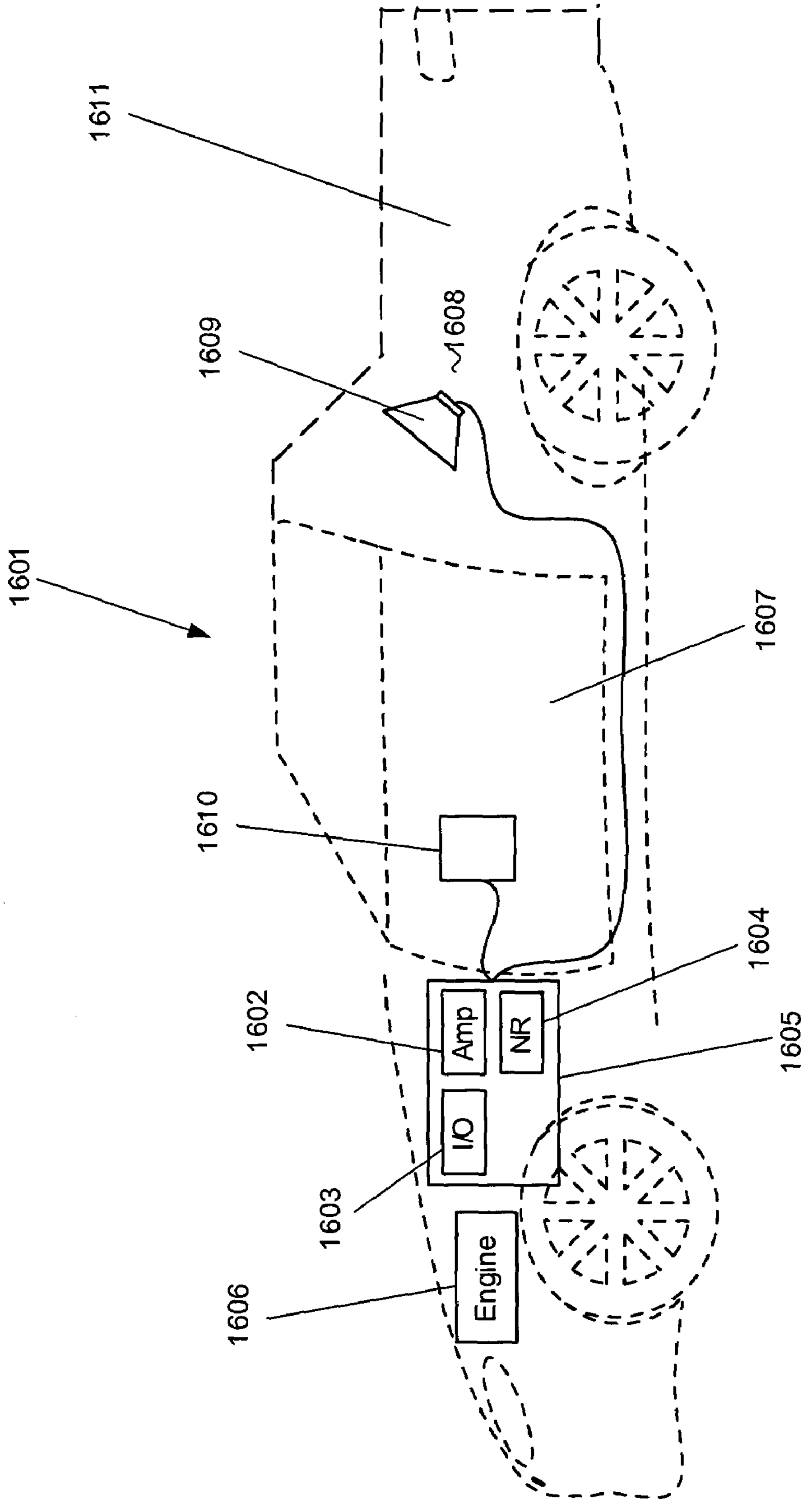
FIG. 16 is an illustrative diagram of a vehicle with stereo system and noise reduction, according an embodiment of the invention.

FIG. 16 is an illustrative diagram of a vehicle with stereo system and noise reduction, according to an embodiment of the invention. FIG. 16 shows an automobile 1601 which has a stereo system 1605. Automobile 1601 also includes other elements typically found in an automobile such as engine 1606, trunk 1611 and door 1607. Stereo system 1605 includes an amplifier 1602, input/output circuitry 1603 and noise reduction circuit 1604. An output of stereo 1605 is coupled with speaker 1610 and speaker 1609. Other speakers are present in other parts of automobile 1601, according to various embodiments. Noise reduction circuit 1604 may be implemented according to various embodiments described in the present application. Speaker 1609 is located in an open space 1608 in a rear portion of automobile 1601. Speaker 1610 is located in door 1607. Such speakers 1609 and 1610 are located in open cavities of automobile 1601.

The methods and structures described herein can be applied to various forms of signal plus noise. The noise will be changing more slowly than the signal, according to particular embodiments of the invention. According to some embodiments, the noise profile is known already, and the noise estimate is then made from the known noise profile. An example of the known noise profile would be the noise of a motor or other mechanism of an electronic device, such as a zoom mechanism on a camera. According to one embodiment of the invention, noise reduction is applied at particular times and not at other times. For example, noise reduction may be applied selectively such as when a camera zooms or when other mechanical mechanism is activated that would normally produce noise. In such an application, a known noise profile may be used, or a noise profile may be generated dynamically. Noise may be additive noise, which is noise added to a clean signal. Such noise may be at the source (such as an air conditioner in an office adding to a person's voice being recorded) or can be added during the transmission of the signal (such as noise on a telephone line or radio transmission). According to one embodiment of the invention, noise reduction is applied during the re-recording of a pre-recorded audio. For example, a home movie may be re-recorded using some form of noise reduction described herein. Such re-recording may take place in a re-recording to the same medium, or to other media such as conversion to DVD, VCD, AVI, etc.

Other embodiments of the invention may include voice over internet protocol (VoIP), and speech recognition. A system may include a speech recognition mechanism, implemented, for example, in hardware and/or software, and the speech recognition system may include some form of noise reduction described herein. The speech recognition system may be integrated with various applications such as speech-to-text applications, as well as commands to control computer or other electronic tasks, or other applications.

Internet radio, movies on demand and other recorded or transmitted content may become corrupted and at low bit rates may be noisy. Some form of noise reduction described herein may be applied in such applications. Noise reduction may also be applied in web conferencing, audio and video teleconferencing, and other conferencing.

With respect to a recording device, such as a camera or camcorder or other recording device, noise reduction described herein may be applied as the recording is made or, alternatively, as the recording is played back. Thus, an embodiment of the invention includes a recording device, such as a camcorder, voice recorder or other recording device which includes noise reduction described herein in whole or in part. Alternatively, an embodiment of the invention includes a playback device, including some form of the noise reduction mechanism described herein. Another embodiment of the invention is a hand-held recording device including some form of noise reduction described herein. Such recorder may be for audio tape and various formats, such as conventional audiotape, or MP3 or other formats. For example, a dictation machine may employ some form of noise reduction described herein.

A device may include various combinations of components. A camera, for example, may include a mechanism for receiving a visual image and an audio input. An audio recorder may have a mechanism for recording such as electronics to record on tape, disk, memory, etc.

Another embodiment of the invention is directed to a hearing aid. The hearing aid includes a mechanism to receive audio signal and present it to the user. Additionally, the hearing aid includes noise reduction mechanism as described herein.

According to another embodiment of the invention, noise reduction is used in radio. For example, a radio receiver may employ noise reduction. A radio receiver may include, for example, a tuner and some form of the noise reduction mechanism described herein.

Aspects of the noise reduction described herein may be applied in combination with some, all or various combinations of the following technologies, according to various embodiments of the invention:

Digital Versatile Disc (DVD)

Digital Versatile Disc Recorder (DVD±R, ±RW)

MPEG I Layer 3 (MP3)

ADPCM (or other compression for voice)

Mini-DV (camcorder)

Digital-8 (camcorder)

Cellular Phone (GSM, GPRS or other technologies)

Land-line Phone (e.g. DSL, POTS analog or other telephone technology)

The processes shown herein may be implemented in computer readable code, such as that stored in a computer system with audio capabilities, or other computer. Such code may also be implemented in an audio video system, such as a television. Further, such process may be implemented in a specialized circuit, such as a specialized digital integrated circuit. The processes and structures described herein can be implemented in hardware, programmable hardware, software or any combination thereof.

The following is an example of one possible computer code implementation of noise reduction, according to an embodiment of the invention.

```
#define N 512                 // number of points per frame //
#define ALPHA 0.8f            // forgetting factor for magnitude estimate //
#define WND 32                     // number of frames to remember //
#define THRESHOLD 0.05f       // threshold used to qualify subtracted signal //
#define GAIN 4.0f             // gain used for over-subtraction of noise estimate //
int j,k;
double mag[N], phase[N];      // magnitude and phase on current frame //
double minimum;               // minimum magnitude //
static double P[N][WND]={0};            // power (magnitude) matrix //
static double noise__est[N] = {0};      // current noise estimate (from minimums) //
// we assume an incoming vector of N points that is the magnitude of the signal //
// estimate the current magnitude spectrum using past history //
for (j=0; j<N;j++) {
    P[j][0] = ALPHA * P[j][1] + (1-ALPHA) * mag[j];
}
// find the minimum power at each frequency over last WND frames, assign to noise__est //
for (j=0; j<N; j++) {
    minimum = P__left[j][0];
    for (k=1; k<WND; k++) {
        if ( P__left[j][k] < minimum ) {
            minimum = P[j][k];
            noise__est[j] = minimum;
            noise__est[N−j−1] = noise__est[j];
        }
    }
    noise__est[j] = noise__est[j] * GAIN;          // over-estimate noise //
}
// drop last frame, permutate matrix, insert current frame //
for ( j=0; j<N; j++) {
    last__sample = P[j][WND-1];
    for ( k=WND-1; k>0; k--) P[j][k] = P[j][k−1];
    P[j][0] = last sample;
}
// subtract noise estimate from magnitude of current frame, compare to threshold //
for ( j=0; j<N; j++) {
    double x,y;
    x = mag[j] − noise__est[j];
    y = THRESHOLD * mag[j];
    if ( x > y ) mag[j] = x; else mag[j] = y;
}
```

The foregoing description of various embodiments of the invention has been presented for purposes of illustration and description. It is not intended to limit the invention to the precise forms described.

What is claimed is:

1. A method of noise reduction comprising:

sampling an audio signal at a sample rate f;

converting the audio signal to a digital signal in time domain;

for each of a series of frames of time, converting the digital signal in the time domain to a digital signal in frequency domain for the frame of time;

wherein the converting includes determining a set of frequency domain values, the frequency domain values in the set created by a set of digital filters, the digital filters related to each other by a constant ratio of filter bandwidth to center frequency, related to a perceptual scale for auditory processing;

obtaining a set of minimum magnitude frequency domain values including, at each frequency represented by the frequency domain values, a frequency domain value having a minimum magnitude from among frequency domain values for such frequency over a time interval spanning multiple frames of time;

subtracting the set of minimum magnitude frequency domain values from the audio signal in frequency domain, for a particular frame of time;

converting the subtracted audio signal to time domain; and outputting the converted audio signal.

2. The method of claim 1, wherein the particular frame of time comprises the current frame of time.

3. The method of claim 1, wherein each frame of time comprises a time span in the range of 10 to 50 milliseconds.

4. The method of claim 1, wherein the time interval spanning multiple frames comprises an interval in a range from 0.25 second to 2 seconds.

5. The method of claim 1, wherein the minimum magnitude frequency domain values are first multiplied by a gain that is greater than unity.

6. The method of claim 1, wherein the subtracted audio signal is compared to a threshold, the threshold being greater than or equal to zero, the threshold being related to a scaled version of the original audio signal, and the greater of the two being used for the conversion to the time domain.

7. The method of claim 1, wherein the subtracted audio signal is modified in a non-linear fashion, by exponentially increasing its magnitude, in order to sharpen the spectral maximums and reduce the spectral minimums.

8. A system comprising:

a set of digital filters, the digital filters related to each other by a constant ratio of filter bandwidth to center frequency, related to a perceptual scale for auditory processing; and a mechanism that samples an audio signal at a sample rate f;

converts the audio signal to a digital signal in time domain;

for each of a series of frames of time, converts, using the set of digital filters, the digital signal in the time domain to a digital signal in frequency domain for the frame of time;

obtains a set of minimum magnitude frequency domain values including, at each frequency represented by the frequency domain values, a frequency domain value having a minimum magnitude from among frequency domain values for such frequency over a time interval spanning multiple frames of time;

subtracts the set of minimum magnitude frequency domain values from the audio signal in frequency domain, for a particular frame of time;

converts the subtracted audio signal to time domain; and outputs the converted audio signal.

9. The system of claim 8, wherein each frame of time comprises a time span in the range of 10 to 50 milliseconds.

10. The system of claim 8, wherein the time interval spanning multiple frames comprises an interval in a range from 0.25 second to 2 seconds.

11. The system of claim 8, wherein the minimum magnitude frequency domain values are first multiplied by a gain that is greater than unity.

12. The system of claim 8, wherein the subtracted audio signal is compared to a threshold, the threshold being greater than or equal to zero, the threshold being related to a scaled version of the original audio signal, and the greater of the two being used for the conversion to the time domain.

13. The system of claim 8, wherein the subtracted audio signal is modified in a non-linear fashion, by exponentially increasing its magnitude, in order to sharpen the spectral maximums and reduce the spectral minimums.

14. The system of claim 8, wherein the mechanism selectively performs the subtraction.

15. The system of claim 8, wherein the subtraction is performed based on whether noise is expected.

16. The system of claim 8, wherein the subtraction is applied if mechanical mechanism of the system is active.

17. A recording device comprising:

an audio input mechanism;

a mechanism that records on a recording medium;

a set of digital filters, the digital filters related to each other by a constant ratio of filter bandwidth to center frequency, related to a perceptual scale for auditory processing; and a mechanism that samples an audio signal received from the audio input mechanism at a sample rate f;

converts the audio signal to a digital signal in time domain;

for each of a series of frames of time, converts, using the set of digital filters, the digital signal in the time domain to a digital signal in frequency domain for the frame of time;

obtains a set of minimum magnitude frequency domain values including, at each frequency represented by the frequency domain values, a frequency domain value having a minimum magnitude from among frequency domain values for such frequency over a time interval spanning multiple frames of time;

subtracts the set of minimum magnitude frequency domain values from the audio signal in frequency domain, for a particular frame of time;

converts the subtracted audio signal to time domain; and records the converted audio signal on the recording medium.

18. The system of claim 17 including a mechanical mechanism that produces noise, wherein the subtraction is applied if mechanical mechanism of the system is active.

19. A multi-media recording device comprising:

an audio input mechanism;

a device that receives a visual image;

a mechanism that records on a recording medium;

a set of digital filters, the digital filters related to each other by a constant ratio of filter bandwidth to center frequency, related to a perceptual scale for auditory processing; and a mechanism that samples an audio signal received from the audio input mechanism at a sample rate f;

converts the audio signal to a digital signal in time domain;

for each of a series of frames of time, converts, using the set of digital filters, the digital signal in the time domain to a digital signal in frequency domain for the frame of time;

obtains a set of minimum magnitude frequency domain values including, at each frequency represented by the frequency domain values, a frequency domain value having a minimum magnitude from among frequency domain values for such frequency over a time interval spanning multiple frames of time;

subtracts the set of minimum magnitude frequency domain values from the audio signal in frequency domain, for a particular frame of time;

converts the subtracted audio signal to time domain; and records the converted audio signal on the recording medium.

20. The multimedia device of claim 19, wherein the visual image is recorded on the recording medium.

21. The system of claim 19 including a mechanical mechanism that produces noise, wherein the subtraction is applied if a mechanical mechanism of the system is active.

22. The system of claim 21 wherein the mechanical mechanism comprises a lens zoom mechanism.

23. A playback device comprising:

an output mechanism;

a mechanism that reads from a recording medium;

a set of digital filters, the digital filters related to each other by a constant ratio of filter bandwidth to center frequency, related to a perceptual scale for auditory processing; and a mechanism that samples an audio signal received from the recording medium at a sample rate f;

converts the audio signal to a digital signal in time domain;

for each of a series of frames of time, converts, using the set of digital filters, the digital signal in the time domain to a digital signal in frequency domain for the frame of time;

obtains a set of minimum magnitude frequency domain values including, at each frequency represented by the frequency domain values, a frequency domain value having a minimum magnitude from among frequency domain values for such frequency over a time interval spanning multiple frames of time;

subtracts the set of minimum magnitude frequency domain values from the audio signal in frequency domain, for a particular frame of time;

converts the subtracted audio signal to time domain; and outputs the converted audio signal on the output mechanism.

24. The playback device of claim 23, including a mechanism that plays video.

25. The playback device of claim 23, wherein the output mechanism includes a speaker.

26. A communications device comprising:

an input;

a set of digital filters, the digital filters related to each other by a constant ratio of filter bandwidth to center frequency, related to a perceptual scale for auditory processing; and a mechanism that samples an audio signal received from the input at a sample rate f;

converts the audio signal to a digital signal in time domain;

for each of a series of frames of time, converts, using the set of digital filters, the digital signal in the time domain to a digital signal in frequency domain for the frame of time;

obtains a set of minimum magnitude frequency domain values including, at each frequency represented by the frequency domain values, a frequency domain value having a minimum magnitude from among frequency domain values for such frequency over a time interval spanning multiple frames of time;

subtracts the set of minimum magnitude frequency domain values from the audio signal in frequency domain, for a particular frame of time;

converts the subtracted audio signal to time domain; and outputs the converted audio signal.

27. The system of claim 26 including a radio tuner.

28. The system of claim 26 including mobile telephone receive and transmit electronics.

* * * * *